Sept. 22, 1936.   E. G. WILSON   2,054,874
APPARATUS FOR USE FOR MEASURING THICKNESSES OF MATERIALS
IN SHEET FORM AND RECORDING THE THICKNESSES THEREON
Filed Aug. 30, 1934   5 Sheets-Sheet 1

WITNESSES
Arthur Swift
George Manbré

INVENTOR.
Evan G. Wilson

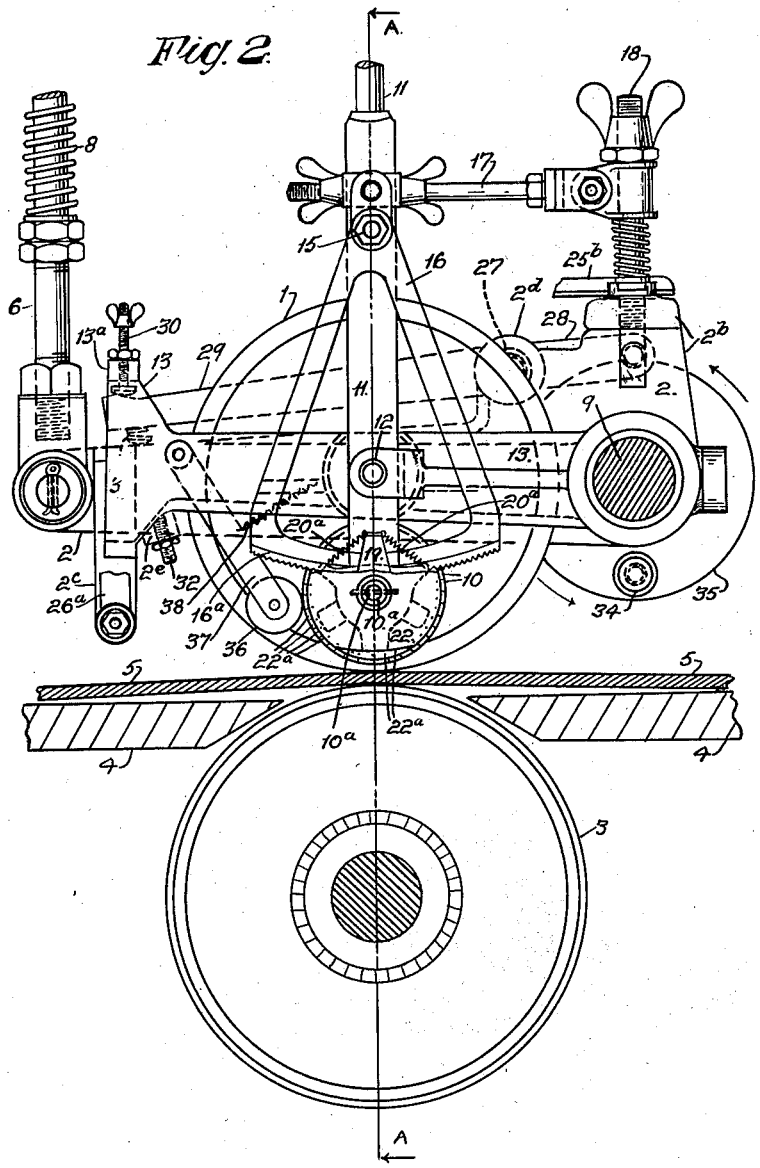

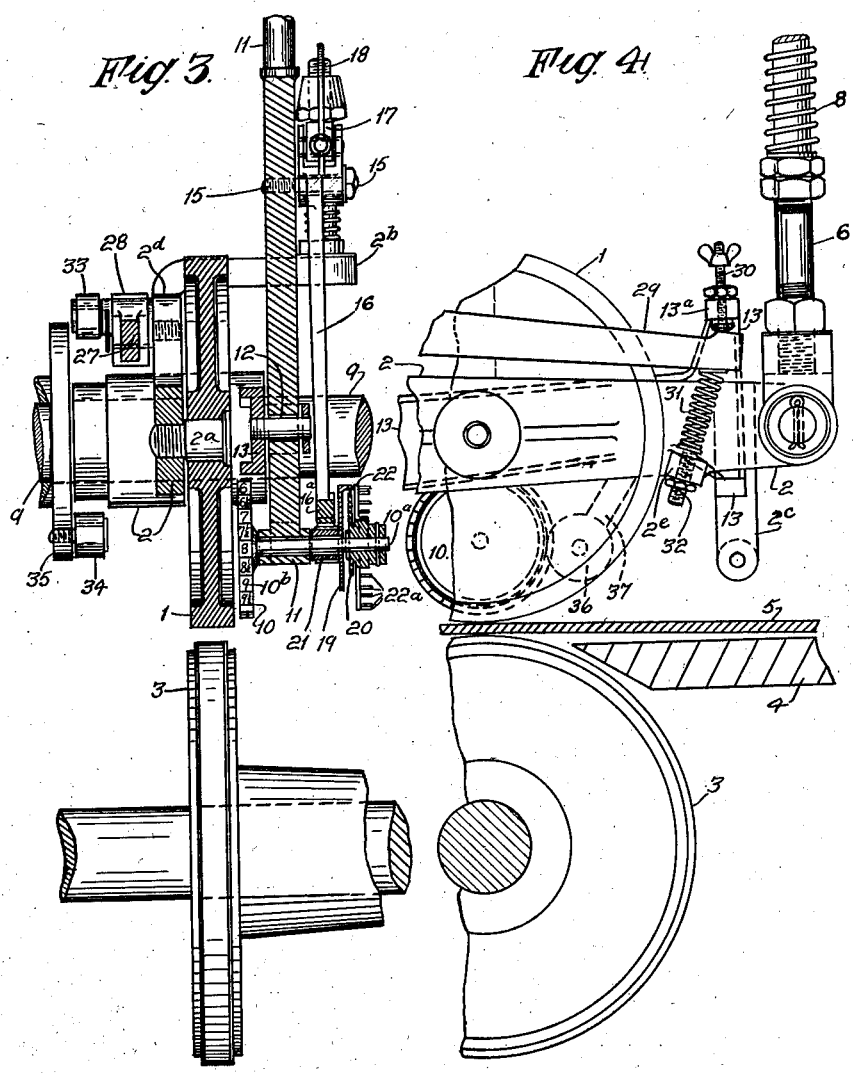

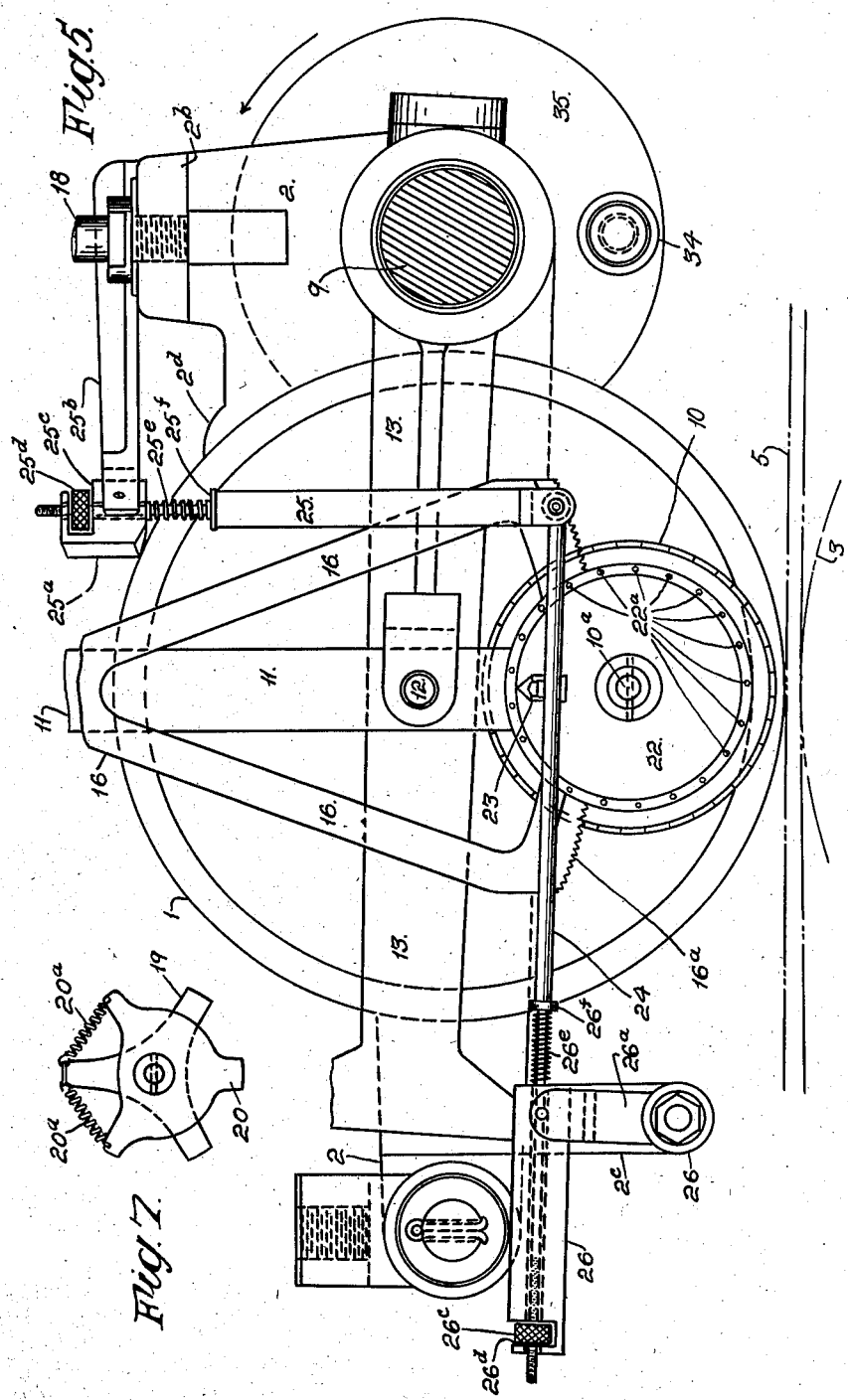

Sept. 22, 1936.  E. G. WILSON  2,054,874
APPARATUS FOR USE FOR MEASURING THICKNESSES OF MATERIALS
IN SHEET FORM AND RECORDING THE THICKNESSES THEREON
Filed Aug. 30, 1934  5 Sheets-Sheet 5

WITNESSES
Arthur Swift
George Manbré

INVENTOR
Evan G Wilson

Patented Sept. 22, 1936

2,054,874

UNITED STATES PATENT OFFICE 2,054,874

APPARATUS FOR USE FOR MEASURING THICKNESSES OF MATERIALS IN SHEET FORM AND RECORDING THE THICKNESSES THEREON

Evan George Wilson, Blundellsands, near Liverpool, England

Application August 30, 1934, Serial No. 742,194
In Great Britain September 9, 1933

6 Claims. (Cl. 101—42)

This invention relates to apparatus for measuring the thicknesses of materials in sheet or strip form and recording such measurements on the sheets or strips, and is particularly adapted for the measuring of sheets—such as the sole leather used in the manufacture of boots and shoes—the thickness of which differs appreciably at various points.

My invention provides improved means whereby there may be recorded on the surface of a sheet, markings which indicate the thickness of different and any selected parts of the sheet, so that, in the case of sole leather for use in the manufacture of boots and shoes, the ascertainment of the varying thicknesses may be effected by mere inspection of the surface of the leather, this being of substantial advantage to manufacturers as it avoids the production of soles of thicknesses not immediately required and so obviates accumulation of stocks of soles of unwanted thicknesses.

When gauging such material as sole leather, which is firm in substance and yet may vary in thickness and be undulating on both of its surfaces, it is difficult to correctly gauge the thickness thereof without causing excessive pressure if measurement is effected on the flat surface of a table or bed.

According to one feature of my invention, the marking or stamping of a sheet of leather or other material is effected at various or regular points or intervals upon its surface, to show the thickness at each point, by means of implements which are caused to mark or register the thickness of the sheet in accordance with the movement or displacement of independently operable feeler discs, or the like, having their axes parallel with rollers below same, so that a sheet passed between said feeler discs and rollers is subjected on both sides to minimum—i. e. as small as practicable—areas of contacting surfaces.

According to another feature of my invention, in order to effect constant and uniform gauging and marking of sheets appreciably varying in thicknesses or/and undulatory contours, said feeler discs, or the like, and marking implements are mounted to independently oscillate about a central point or common axis.

One embodiment of my invention includes rollers protruding upwardly through a table or the like; contact or "feeler" elements disposed above said rollers and adapted to be upwardly displaced by a sheet of material passed between same and the roller table, or the like; type or like wheels; means operatively associating said type wheels and said feeler elements whereby rotary motion proportionate to the displacements of the feeler elements is communicated to the wheels; means whereby each type wheel is caused or permitted to descend on to and mark a sheet then below same at the point of contact, or substantially at the point of contact, of its feeler element with the sheet; and means whereby said wheel is steadied in its operative movement and retracted after the marking operation; and said feeler and marking devices with associated parts being mounted to independently oscillate about a central point or common axis.

Marking devices operable through pinions flexibly coupled by plate members with locating discs may be utilized to co-operate with steadying centres, or the like, said marking devices being caused to descend into contact with the surface of a moving sheet and mark same through the motion of cam members carrying rollers adapted to move levers or striker-elements and actuate—against spring resistance—rocker bars, or the like, associated with springs or weights adapted to return said rocker bars and marking devices to their normal positions after each revolution of said roller-carrying cam members. Said rocker bars, through the manner of their pivotal connection with a driving shaft may provide enhancement or diminution—according to the direction of rotation of said shaft—of pressure of the marking devices on a sheet.

I will further describe my invention with the aid of the accompanying sheets of explanatory drawings which illustrate, by way of example only, one mode of carrying the same into effect.

In said drawings:—

Fig. 2 is a side elevation of a feeler and marking device with part of a self-positioning mechanism removed, and Fig. 3 is a sectional elevation taken as on the line A—A Fig. 2, whilst Fig. 4 is the reverse side elevation of Fig. 2 shown partly broken away.

Fig. 5 is a side elevation of mechanism adapted to automatically position the marking implement, and Fig. 6 is a plan view.

Fig. 7 is an elevation of plate members adapted to yieldably couple a locating disc or wheel to its marking implement.

Figure 1:
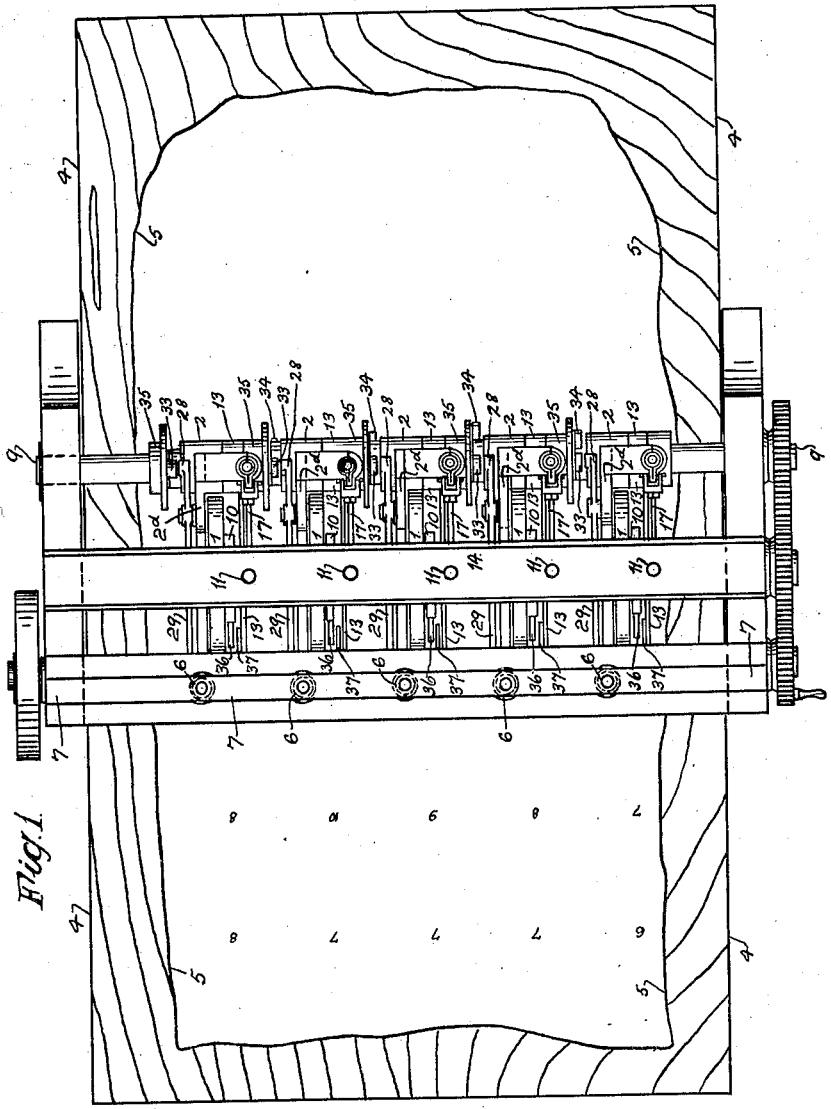
Fig. 1 is a plan view of feeler and marking devices and a sheet of material in the course of being marked.

Referring to the drawings, I designates a feeler wheel or disc revolubly mounted on a pin 2ª of a horizontally disposed arm or bar 2 located immediately above a feeding drum or roller 3 protruding through the surface of a table 4 and supporting a sheet 5; said arm 2 is connected at one end to a guide rod 6 slidably mounted within a cross bar 7 (Fig. 1) under tension of a spring 8 and is pivotally mounted at its opposite end on a driving shaft 9.

A marking wheel or disc 10 attached to a spindle 10ª is revolubly disposed adjacent to said feeler wheel 1 in the lower end of a vertical rod or guide 11 which is pivotally mounted upon a pin 12 attached to a rocker bar 13 having one end also pivotally mounted upon said shaft 9; the upper portion of said guide 11 is slidably encompassed by a second cross bar 14 (Fig. 1) and has—suitably positioned between said cross bar 14 and pin 12—another pin 15 which pivotally carries a quadrant or sector-shaped portion 16ª of a lever 16 the upper extremity whereof is provided with a laterally extending link 17 yieldably associated with a vertical stem or stud 18 fixed in a bracket extension 2ᵇ located above shaft 9.

Mounted to revolve conjointly with said marking wheel 10 through the means of plate members 19 and 20 yieldably coupled to each other by springs 20ª is a small spur pinion 21 in mesh with the quadrant toothed portion 16ª of lever 16; a locating disc 22 is secured to spindle 10ª. Positioned around and adjacent to the circumferential edge of said locating disc 22—being secured at right angles to and projecting outwardly from the face thereof—are a number of pegs 22ª evenly spaced apart in such manner that any two will be approximately in alignment with the top and bottom parts of the figures 10ᵇ carried by marking wheel 10; and arranged to pass through any one of the spaces between said pins 22ª is a cone or pointed projection or centre 23 attached to a rod 24 disposed across the upper portion of locating disc 22 so that centre 23 normally lies below the uppermost of the circle of pins 22ª.

The end of rod 24 projecting towards shaft 9 is hingedly coupled to the lowermost part of a vertically positioned carrier 25 the upper end whereof is screw-threaded and slidably disposed within a block 25ª pivotally mounted within the arms of the bifurcated end of a bracket member 25ᵇ secured to lug 2ᵇ of bar 2; said block 25ª is provided with a slot 25ᶜ containing a finger nut 25ᵈ through which the upper end of carrier 25 is threaded. A compression spring 25ᵉ is arranged to contact with the underside surface of block 25ª and the shoulder 25ᶠ formed at the junction of the threaded portion with the other part of carrier 25, thus preventing finger nut 25ᵈ from vibrating and slacking back.

The other end of rod 24 remote from shaft 9 is screw-threaded and slidably disposed within a housing 26 pivotally mounted between the arms of the bifurcated upper portion of a bracket 26ª secured by means of an extension piece 26ᵇ to lug 2ᶜ of bar 2.

Said housing 26 is of sufficient length to permit of the convenient manipulation of a finger nut 26ᶜ disposed around the screw-threaded end of rod 24 and within a slot 26ᵈ provided for its reception at the outermost end of housing 26; and abutting against the innermost end of housing 26 is an end of a compression spring 26ᵉ disposed around rod 24 and having its other end in abutment with a collar 26ᶠ attached thereto, thus preventing finger nut 26ᶜ from vibrating and slacking back.

Pivotally mounted upon a pin 27 secured to a lug extension 2ᵈ situated at the upper part of bar 2 adjacent to shaft 9 is a lever 28, 29, the upper part of the end of arm 29 whereof is adapted to engage with the head of a stud 30 adjustably secured in an extension 13ª of the outermost end of rocker bar 13 and by means of which, rocker bar 13 carrying marking wheel 10 may be lowered, if required, in order to operate at enhanced pressure and with quicker action, whilst the lower part of the end of said arm 29 is in contact with the uppermost end of a compression spring 31 the lower end whereof is carried by means of a stud 32 adjustably secured to a lug 2ᵉ extending from the end of bar 2 beneath guide rod 6 adjacent to lug 2ᶜ. The shorter arm 28 of said lever 28, 29 carries at its end a roller 33 adapted to engage with another roller 34 rotatably mounted on a disc or flange member constituting a cam 35 secured to shaft 9. Roller 34 of cam 35 and co-operating roller 33 are small in diameter to permit rocker bar 13 to drop with an instantaneous action, the smaller the diameter of said rollers 33 and 34 the quicker or more sudden is the motion effected.

The characters upon marking wheel 10 are supplied with ink, or the like, by means of a roller pad 36 revolubly mounted on an arm 37 pivotally connected with rocker bar 13 and held against said marking wheel 10 by means of spring 38 the ends whereof are secured to arm 37 and rocker bar 13, respectively.

In operation, as a sheet 5 is passed over feeding rollers 3 of table 4, feeler wheels 1 are independently maintained in contact with the adjacent surface of the moving sheet by reason of their weight which is increased by the weight of the carrier assembly comprising bar 2 and its associated parts and, if required, further enhanced by means of spring 8. Feeler wheels 1 and lever arms 28, 29 of bar 2 which oscillates about its common axis—shaft 9, to move up and down in accordance with variations in the thickness of sheet 5—and where undulations are present to the extent thereof—and as the areas of contacting surfaces applied by feeler wheels 1 and feeding rollers 3—the axes whereof being parallel—are as small as practicable the varying thicknesses are accurately gauged throughout said sheet 5 as it moves between them. By serrating or slotting the peripheral faces of feeding rollers 3, the areas of contacting surfaces may be further reduced.

Assuming that sheet 5 is somewhat thin, then feeler wheels 1 in their lowermost disposition will displace bars 2 downwardly to move links 17 and pivot levers 16, causing toothed quadrants 16ª to revolve pinions 21 with coupling plates 19, springs 20ª, coupling plates 20, locating discs 22, and shafts 10ª; and marking wheels 10—according to the numbers representing the gauges of thickness prevailing—are brought into position for register and indication. Shaft 9 revolves cams 35 and brings rollers 34 into engagement with rollers 33 of lever members 28, causing arms 29 to compress springs 31 and allow rocker bars 13—which, being independently oscillatable about their common axis, shaft 9—to move downward towards the surface of sheet 5, the frictional load on said rocker bars 13 being increased or diminished according to the direction of rotation of said driving shaft 9, within the pivotal attachment of said rocker bars 13 which convey marking wheels 10 and locating discs 22 towards the surface of sheet 5, so that pairs of pins 22ª of locating discs 22 will automatically position themselves over the and on each side of centers 23, thereby holding locating discs 22 and marking wheels 10 stationary whilst impressing the required gauge numbers in or upon the surfaces of measured areas; any tendency for the impressions to be blurred or smudged is minimized due to the compensating action of springs 20a coupling plates 19 to plates 20.

The described sequence of operations is repeated during each complete rotary movement of the cams 35, so that sheet 5 is marked at various parts over its area as shown in Fig. 1, each mark indicating the thickness—of desired exactitude, according to practical requirements—of the sheet at the particular part.

In order to ensure clear prints upon sheet 5 whilst moving under marking wheels 10, rollers 34 of cams 35 can be doubled in speed so that their contacting action with rollers 33 impart a still more instantaneous motion whilst retaining the same speed during a complete cycle of said cams 35, thereby maintaining the same spacing of markings which may be effected by the provision of ratchet and pawl means associated with a crank shaft.

Further, when very light markings are required the requisite weight may be taken off rocker bars 13 and marking wheels 10 by means of slidably disposed balance weights positioned at the opposite ends of rocker bars 13 projecting from the other side of their common axis—shaft 9.

It is to be understood that whilst, for convenience of description, my invention has been described with reference to the employment of a plurality of marking units, I desire my claims to include apparatus adapted to the use of a single marking implement only.

What I claim as my invention and desire to secure by Letters Patent is:—

1. Apparatus for measuring the thicknesses of materials in sheet and strip form and recording the thicknesses thereon, comprising rollers protruding upwardly through a table; contacting "feeler" elements disposed above said rollers and adapted to be upwardly displaced by a sheet of material passed between same and the roller table; type wheels; means operatively associating said type wheels and said feeler elements whereby rotary motion proportionate to the displacements of the feeler elements is communicated to the type wheels; means whereby each type wheel is caused to descend on to and mark a sheet then below same substantially at the point of contact of its feeler element with the sheet; and means whereby said wheel is steadied in its operative movement and retracted after the marking operation; and said feeler and marking devices with associated parts being mounted to independently oscillate about a common axis.

2. Apparatus for measuring the thicknesses of materials in sheet and strip form and recording the thicknesses thereon as claimed in the preceding claim 1, provided with means as hereinbefore described which—when the apparatus is in operation—effects enhancement and diminution of pressure as desired of the feeler discs, upon a sheet.

3. Apparatus for measuring the thicknesses of materials in sheet and strip form and recording the thicknesses thereon as claimed in the preceding claim 1, in which marking devices operable through pinions flexibly coupled by plate members with locating discs, co-operate with steadying centers, for the purpose specified.

4. In apparatus for measuring the thicknesses of materials in sheet and strip form and recording the thicknesses thereon as claimed in the preceding claim 1, cam members carrying rollers adapted to move striker-elements and actuate—against spring resistance—rocker bars, associated with spring means, for the purpose specified.

5. In apparatus for measuring the thicknesses of materials in sheet and strip form and recording the thicknesses thereon as claimed in the preceding claim 1, cam members carrying rollers adapted to move striker-elements and actuate—against spring resistance—rocker bars associated with weight means, for the purpose specified.

6. In apparatus for measuring the thicknesses of materials in sheet and strip form and recording the thicknesses thereon, as claimed in the preceding claim 1, rocker bars carrying the feeler and marking devices are so pivotally connected with a driving shaft as to provide enhancement and diminution of pressure of the marking devices according to the direction of rotation of said shaft, for the purpose specified.

EVAN GEORGE WILSON.